U S011460938B2

United States Patent
Kwon et al.

(10) Patent No.: US 11,460,938 B2
(45) Date of Patent: Oct. 4, 2022

(54) METHOD AND APPARATUS FOR PROCESSING MULTI-TOUCH INPUT AT TOUCH SCREEN TERMINAL

(71) Applicant: Samsung Electronics Co., Ltd., Gyeonggi-do (KR)

(72) Inventors: Won-Seok Kwon, Gyeonggi-do (KR); Jin Park, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/588,230

(22) Filed: Sep. 30, 2019

(65) Prior Publication Data

US 2020/0026386 A1 Jan. 23, 2020

Related U.S. Application Data

(63) Continuation of application No. 14/979,664, filed on Apr. 6, 2015, now Pat. No. 10,429,969, which is a (Continued)

(30) Foreign Application Priority Data

Feb. 10, 2011 (KR) .................. 10-2011-0011772

(51) Int. Cl.
*G06F 3/04883* (2022.01)
*G06F 3/0485* (2022.01)
*G06F 3/041* (2006.01)

(52) U.S. Cl.
CPC .......... *G06F 3/0412* (2013.01); *G06F 3/0485* (2013.01); *G06F 3/04883* (2013.01); *G06F 2203/04104* (2013.01)

(58) Field of Classification Search
CPC .. G06F 3/0488; G06F 3/04883; G06F 3/0485; G06F 3/041; G06F 3/0412;
(Continued)

(56) References Cited

U.S. PATENT DOCUMENTS 6,323,846 B1 11/2001 Westerman
7,030,861 B1 * 4/2006 Westerman ......... G06F 3/04883
345/173

(Continued)

FOREIGN PATENT DOCUMENTS

JP 2008107865 A * 5/2008
JP 2009525538 A * 7/2009
KR 1020100096424 9/2010

OTHER PUBLICATIONS

Magic Mouse—Safari Tab Switching, Oct. 31, 2009, 5 pages (Year: 2009).*

(Continued)

*Primary Examiner* — Yongjia Pan
(74) *Attorney, Agent, or Firm* — The Farrell Law Firm, P.C.

(57) ABSTRACT

Methods, apparatuses, and systems for processing multi-touch input in a multi-tasking terminal with a touch screen are described. In one method herein, an electronic apparatus displays a first application program on its touch screen while both the first application program and a second application program are being multitasked, detects a flicking of four or more fingers in the displayed first application program on the touch screen; and, in response to detecting of the flicking of four or more fingers, switches the touch screen from the display of the first application program to a display of the second application program.

2 Claims, 11 Drawing Sheets

Related U.S. Application Data continuation of application No. 13/370,549, filed on Feb. 10, 2012, now Pat. No. 9,003,322.

(58) Field of Classification Search
CPC .......... G06F 2203/04104; B60J 5/0493; B60Y 2400/90; B60Y 2400/30
See application file for complete search history.

(56) References Cited

U.S. PATENT DOCUMENTS

| | | | |
|---|---|---|---|
| 7,479,948 B2 | 1/2009 | Kim et al. | |
| 7,516,414 B2* | 4/2009 | Cragun | G06F 9/451 715/777 |
| 7,705,830 B2* | 4/2010 | Westerman | G06F 3/04883 345/173 |
| 8,631,355 B2* | 1/2014 | Murillo | G06F 16/436 715/863 |
| 8,762,879 B1* | 6/2014 | Goodger | G06F 16/957 715/777 |
| 8,799,827 B2 | 8/2014 | Hinckley | |
| 2006/0125803 A1 | 6/2006 | Westerman et al. | |
| 2007/0097093 A1 | 5/2007 | Ohshita et al. | |
| 2007/0177804 A1* | 8/2007 | Elias | G06F 3/04883 382/188 |
| 2008/0036743 A1 | 2/2008 | Westerman et al. | |
| 2009/0037849 A1* | 2/2009 | Immonen | G06F 3/017 715/863 |
| 2010/0095240 A1 | 4/2010 | Shiplacoff et al. | |
| 2010/0110025 A1* | 5/2010 | Lim | G08C 21/00 345/173 |
| 2010/0214237 A1 | 8/2010 | Echeverri et al. | |
| 2010/0214322 A1 | 8/2010 | Llm et al. | |
| 2010/0235794 A1* | 9/2010 | Ording | G06F 3/0488 715/863 |
| 2010/0313125 A1 | 12/2010 | Fleizach et al. | |
| 2011/0007000 A1* | 1/2011 | Lim | G06F 3/0488 345/173 |
| 2011/0078624 A1 | 3/2011 | Missig et al. | |
| 2011/0154268 A1* | 6/2011 | Trent, Jr. | G06F 3/017 715/863 |
| 2011/0179368 A1* | 7/2011 | King | G06F 3/0482 715/769 |
| 2011/0179387 A1 | 7/2011 | Shaffer et al. | |
| 2011/0202877 A1* | 8/2011 | Lassonde | G06F 3/0482 715/817 |
| 2012/0019452 A1 | 1/2012 | Westerman | |
| 2012/0019453 A1 | 1/2012 | Westerman | |
| 2012/0036485 A1* | 2/2012 | Watkins, Jr. | G06F 1/1626 715/863 |
| 2012/0054648 A1* | 3/2012 | Morris | G06F 3/0481 715/764 |
| 2012/0060083 A1* | 3/2012 | Yuan | G06F 16/957 715/234 |
| 2012/0062489 A1 | 3/2012 | Andersson et al. | |
| 2012/0092277 A1 | 4/2012 | Momchilov | |
| 2014/0304641 A1* | 10/2014 | Kim | G06F 3/0482 |

OTHER PUBLICATIONS

"Better Touch Tool" Demonstration! With Track Pad!, Jan. 15, 2010, 1 page (Year: 2010).*
Devin Coldewey, Be still my heart: multi-touch tab switching in Firefox!, Jun. 30, 2009, 2 pages (Year: 2009).*
The Five Browser Shortcuts Everyone Should Know, Jan. 15, 2008, 24 pages (Year: 2008).*
Toggle between applications via four finger gesture?, Jan. 28, 2011, 5 pages (Year: 2011).*
Devin Coldewey, Be still my heart: multi-touch tab switching in Firefox!, Jun. 30, 2009, 1 page (Year: 2009).*
Mike Taulty, Touched ( Part 1 )—Getting Touch for Free, Oct. 15, 2010, 21 pages (Year: 2010).*
Tabs vs Windows, Feb. 9, 2010, 4 pages (Year: 2010).*
Kevin Purd, Get Mac-Like Scrolling and Gestures on a Windows Laptop, Mar. 16, 2010, 10 pages (Year: 2010).*
Rob Griffith, Create a tab-switching gesture shortcut in Firefox 3.5, Jul. 9, 2009, 2 pages (Year: 2009).*
Tabbed Browsing, Dec. 10, 2005, 1 page (Year: 2005).*
Mobile/UI/Designs/TouchScreen/Proposal1,Feb. 28, 2008, 4 pages (Year: 2008).*
Adam Stiles, Tabbed Browser DNA, Feb. 11, 2005, 6 pages (Year: 2005).*
iGesture Pad, URL—https://www.microsoft.com/buxtoncollection/detail.aspx?id=213, 2003, 2 page (Year: 2003).*
Korean Office Action dated Dec. 29, 2016 issued in counterpart application No. 10-2011-0011772, 9 pages.
Korean Office Action dated Mar. 27, 2018 issued in counterpart application No. 10-2011-0011772, 4 pages.
Korean Office Action dated Aug. 30, 2017 issued in counterpart application No. 10-2011-0011772, 10 pages.

* cited by examiner

YAHOO! NEWS    09:20 AM

YAHOO! NEWS

[ NEWS SEARCH ]

Obama urges U.S. to pull together after Arizona rampage

By Steve Holland Steve Holland – Mon Jan 10, 9:20 pm ET

WASHINGTON (Reuters) – President Barack Obama mourned victims of an Arizona gunman on Monday and steered clear of a debate on whether harsh political rhetoric inspired the attack on a congresswoman.

As many members of his own Democratic Party decried the often rabid level of political discourse in the country, Obama said he is grieving for the victims and their families and honoring those who apparently prevented more deaths.

Obama will travel to Arizona on Wednesday to attend a memorial service for the victims of the shooting attack on Representative Gabrielle Giffords in Tucson, a U.S. official said. Victims included a federal judge and a 9-year-old girl.

1/5

(B)

YAHOO! NEWS    09:20 AM

YAHOO! NEWS

[ NEWS SEARCH ]

Obama will travel to Arizona on Wednesday to attend a memorial service for the victims of the shooting attack on Representative Gabrielle Giffords in Tucson, a U.S. official said. Victims included a federal judge and a 9-year-old girl.

1/5

[ For complete coverage of politics and policy, go to Yahoo! Politics ]

Giffords is in critical condition with a gunshot to the brain. She had been holding a "Congress on Your Corner" meeting with constituents near a grocery store when she was attacked.

"Right now the main thing we're doing is to offer our thoughts and prayers to those who've been impacted, making sure that we're joining together and pulling together as a country," Obama said.

FIG.4B (A)

YAHOO! NEWS    09:20 AM

YAHOO! NEWS

[ NEWS SEARCH ]

Obama urges U.S. to pull together after Arizona rampage

By Steve Holland Steve Holland – Mon Jan 10, 9:20 pm ET

WASHINGTON (Reuters) – President Barack Obama mourned victims of an Arizona gunman on Monday and steered clear of a debate on whether harsh political rhetoric inspired the attack on a congresswoman.

As many members of his own Democratic Party decried the often rabid level of political discourse in the country, Obama said he is grieving for the victims and their families and honoring those who apparently prevented more deaths.

Obama will travel to Arizona on Wednesday to attend a memorial service for the victims of the shooting attack on Representative Gabrielle Giffords in Tucson, a U.S. official said. Victims included a federal judge and a 9-year-old girl.

1/5

(B)

YAHOO! NEWS    09:20 AM

YAHOO! NEWS

[ NEWS SEARCH ]

[ For complete coverage of politics and policy, go to Yahoo! Politics ]

Giffords is in critical condition with a gunshot to the brain. She had been holding a "Congress on Your Corner" meeting with constituents near a grocery store when she was attacked.

"Right now the main thing we're doing is to offer our thoughts and prayers to those who've been impacted, making sure that we're joining together and pulling together as a country," Obama said.

Bowing their heads solemnly, Obama and first lady Michelle Obama paused for a moment of silence on the White House South Lawn on a cold, windy day in Washington.

METHOD AND APPARATUS FOR PROCESSING MULTI-TOUCH INPUT AT TOUCH SCREEN TERMINAL

PRIORITY

This application is a Continuation Application of U.S. patent application Ser. No. 14/679,664, filed on Apr. 6, 2015, which is a Continuation Application of U.S. patent application Ser. No. 13/370,549, filed on Feb. 10, 2012, now U.S. Pat. No. 9,003,322, issued on Apr. 7, 2015, which claims priority under 35 U.S.C. § 119(a) to Korean Patent Application No. 10-2011-0011772, filed in the Korean Intellectual Property Office on Feb. 10, 2011, the content of each of which is incorporated herein by reference.

BACKGROUND OF THE INVENTION

1. Field of the Invention

The present invention relates to a method and an apparatus for processing multi-touch input in a touch screen terminal, in particular to a method and an apparatus for processing input by multi-touch flicking.

2. Description of the Related Art

Portable terminals such as mobile terminals, electronic notebooks, personal multi-terminals and the like have been becoming daily necessities in the modern life.

Portable terminals are means for providing various services based on the telecommunication network such as internet. Such service may include electronic mail, remote computer connection, file transfer, internet information searching, internet talk and conversation, electronic bulletin board, hypertext information browsing and the like. Recent portable terminals adopt touch-screen method to enable the user to utilize service easily.

In general, a user may search necessary information on internet with a browser, which is a client application program used for searching necessary information on internet. Recently, such browser has become tab-browsing which provides browsing method to enable a user to open a plural of windows with a tab and to move between windows by clicking the tab.

Further, portable terminals may support multi-tasking in that a plural of application programs can be implemented at the same time. Under such circumstances, a user has to switch to the window of the browser among the various application programs by clicking the tab one by one for browsing the window which is cumbersome.

SUMMARY OF THE INVENTION

The present invention addresses at least the problems and disadvantages described above and provides at least the advantages described below. An aspect of the present invention is to provide a method and an apparatus for processing input depending on the number of touch flickings in a touch-screen terminal. Another aspect of the present invention is to provide a method and an apparatus for switching to the corresponding window depending on a movement and a number of touch flickings detected during a tab-browsing mode in a touch-screen terminal. Another aspect of the present invention is to provide a method and an apparatus for switching to a corresponding application program depending on a movement and a number of touch flickings detected while multi-tasking in a touch-screen terminal. Another aspect of the present invention is to provide a method and an apparatus for scrolling the content shown on the screen in a speed proportional according to a movement and/or the number of multi-touch flickings on a touch-screen terminal.

According to one aspect of the invention, a method is provided for a touch screen on a multi-tasking device, including determining a number of fingers in a flicking of one or more fingers in a currently-displayed application program on the touch screen and, if the determined number of fingers in the flicking is four or more, switching the touch screen from the currently-displayed application program to a not-currently-displayed application program.

According to another aspect of the invention, an apparatus is provided, including a touch screen and a controller which determines a number of fingers in a flicking of one or more fingers in a currently-displayed application program on the touch screen and, if the determined number of fingers in the flicking is four or more, controls the touch screen to switch from the currently-displayed application program to a not-currently-displayed application program.

According to yet another aspect of the present invention, a method for a touch screen is provided, including displaying a first application program on the touch screen; determining a number of fingers in a flicking of one or more fingers in the displayed first application program on the touch screen; and, if the determined number of fingers in the flicking is four or more, determining whether a second application program is running and, if it is determined that a second application is running, switching from the first application program to the second application program.

According to still another aspect of the present invention, an apparatus is provided, including a touch screen and a controller which controls the touch screen to display a first application program when the first application program is presently running on the apparatus; determines a number of fingers in a flicking of one or more fingers in the displayed first application program; if the determined number of fingers in the flicking is four or more, determines whether a second application program is running; and, if the determined number of fingers is four or more and it is determined that a second application program is running, controls the touch screen to switch from the displayed first application program to the second application program.

According to still yet another aspect of the present invention, a non-transitory machine-readable medium storing code is provided which, when executed by one or more processors of an apparatus including a touch screen, implements the performance of a method including displaying a first application program on the touch screen; determining a number of fingers in a flicking of one or more fingers in the displayed first application program on the touch screen; and, if the determined number of fingers in the flicking is four or more, determining whether a second application program is running and, if it is determined that a second application is running, switching from the first application program to the second application program.

According to still yet another aspect of the present invention, a method performed by an electronic apparatus having a touch screen is provided, including displaying a first application program on the touch screen; detecting a flicking of fingers in the displayed first application program on the touch screen while both the first application program and a second application program are being multitasked wherein a number of fingers in the flicking is four or more; and, in response to detecting of the flicking of fingers, switching a display of the first application program to a display of the second application program on the touch screen.

BRIEF DESCRIPTION OF THE DRAWINGS

The above and other aspects, features and advantages of certain embodiments of the present invention will become more apparent from the following detailed description taken in conjunction with the accompanying drawings, in which:

FIG. 4B to FIG. 4D illustrate screens in which to scroll the contents shown on web-browser window according to an exemplary embodiment of the present invention.

DETAILED DESCRIPTION OF EMBODIMENTS OF THE PRESENT INVENTION

Exemplary embodiments of the present invention will be described herein below with reference to the accompanying drawings. For the purposes of clarity and simplicity, well-known functions or constructions are not described in detail as they would obscure the invention in unnecessary detail. Also, the terms used herein are defined according to the functions of the present invention. Thus, the terms may vary depending on user's or operator's intension and usage. That is, the terms used herein must be understood based on the descriptions made herein.

A purpose of the present invention is to provide a method and an apparatus for processing input depending on the number and movement of touch flickings detected in a touch-screen terminal.

Figure 1:
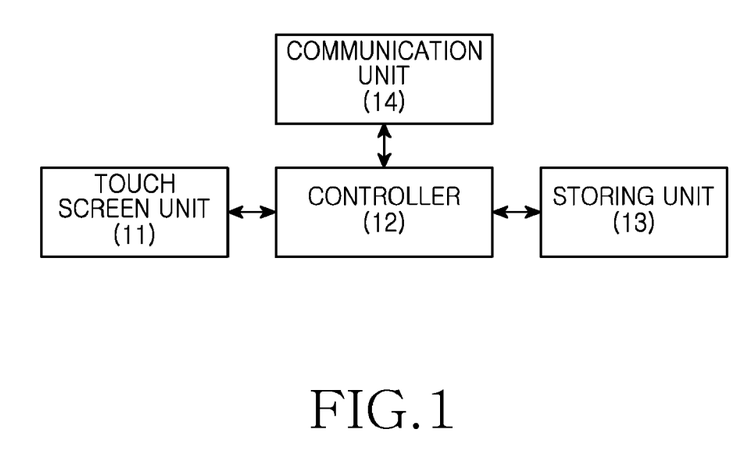
FIG. 1 is a block diagram of a touch screen terminal according to an exemplary embodiment of the present invention.

FIG. 1 is a block diagram of a touch screen terminal according to an exemplary embodiment of the present invention.

Referring to FIG. 1, a touch screen terminal according to the present invention includes a touch-screen unit 11 for input and output, a store unit 13 for storing data, a communication unit 14 for communicating, and a controller 12 for controlling overall operation of the touch screen terminal.

In operation, the touch-screen unit 11 outputs an input signal generated by a touch to the controller 12, and data corresponding to the input signal is displayed according to the instruction of the controller 12. The store unit 13 stores prescribed programs to control the overall operation of the touch-screen terminal as well as various data input and output on implementing the controlling operation of the touch-screen terminal The communication unit 14 transmits, receives and treats wire signal or wireless signal. The controller 12 controls the overall operation of the touch-screen terminal.

Hereinafter, the method of processing input depending on the number of touch flickings of the controller 12 will be detailed in below, referring to the drawings.

Figure 2A:
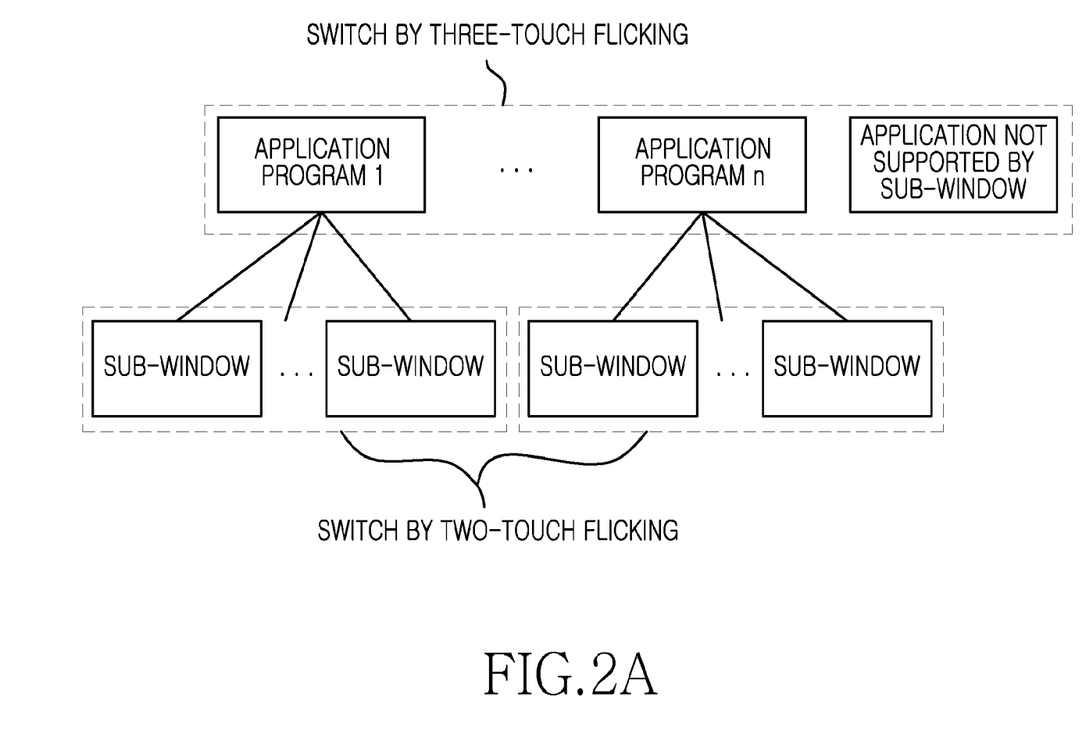
FIG. 2A is a drawing illustrating hierarchy switching window depending on the number of touch flickings according to an exemplary embodiment of the present invention.

FIG. 2A is a drawing illustrating a hierarchy of switching windows depending on the number of touch flickings according to an exemplary embodiment of the present invention.

Referring to FIG. 2A, the touch-screen terminal of the present invention may implement various application programs at the same time. The application program can be classified on the basis of whether it can open sub-window or not. For example, a browser may have a tab-window as a sub-window. The tab-window is a window with tabs so that a user can move to the desired window for browsing by clicking the tab.

According to an embodiment of the present invention, the hierarchy to which a window switches varies depending on the number of touch flickings The touch flickings means an action to push finger(s) while touching a touch-screen.

According to an embodiment of the present invention, the occurrence of three-touch flickings makes switch as application program unit. And also, if two-touch flickings occurs, the switch of sub-window unit opened in the application program and browsing at present is made.

In the above-mentioned description, only the case in that one to three-touch flickings occurs for illustrative purposes, but the same principle as the case may be applied to equal or more than four-touch flickings For example, one application program may have subordinate sub-window in hierarchy and the above mentioned method can be applied to.

Figure 2B:
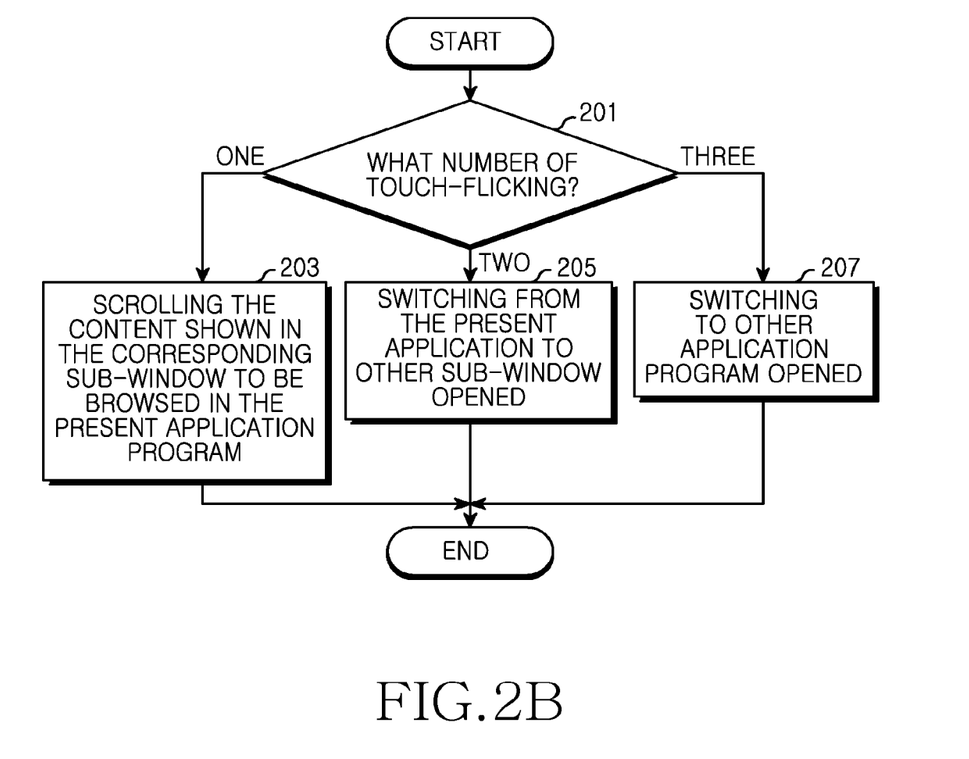
FIG. 2B is a flowchart illustrating procedure for switching window depending on the number of touch flickings according to an exemplary embodiment of the present invention.

FIG. 2B is a flowchart illustrating procedure for switching window depending on the number of touch flickings according to an exemplary embodiment of the present invention.

Referring to FIG. 2B, the controller 12 verifies the movement of a number of touch flickings 201.

If one-touch flickings occurs, the controller 12 scrolls the content that is browsed in the present application program and displayed on the corresponding sub-window in the direction of the touch flickings 203. If two-touch flickings occurs, the controller 12 makes switch to other sub-window opened in the present application program 205. If three-touch flickings occurs, the controller 12 makes switch to other application program that is opened 207.

Figure 3A:
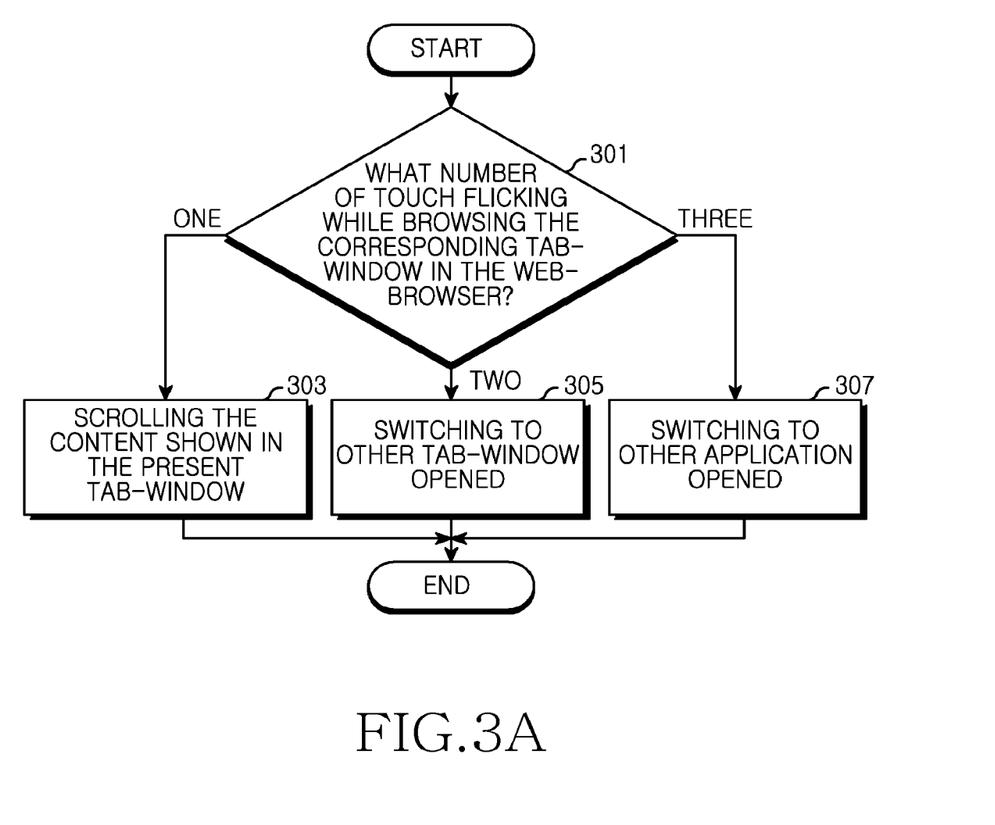
FIG. 3A is a flowchart illustrating procedure for switching window according to the number of touch flickings while browsing a web-browser according to an exemplary embodiment of the present invention.

FIG. 3A is a flowchart illustrating procedure for switching window according to the number of touch flickings while browsing a web-browser according to an exemplary embodiment of the present invention.

Figure 3B:
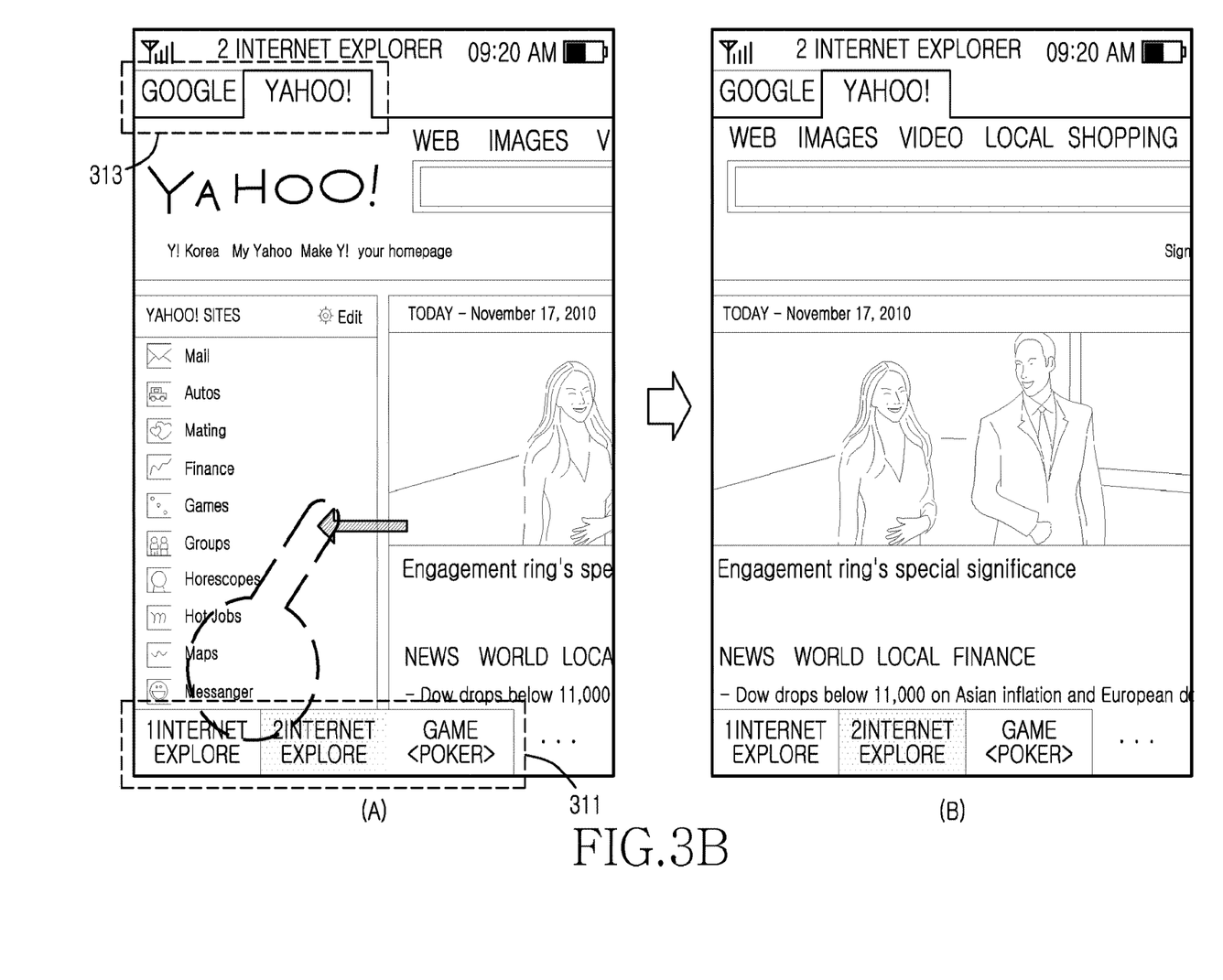
FIG. 3B to 3D is a flowchart illustrating procedure for switching window depending on the number of touch flickings while browsing a web-browser according to an exemplary embodiment of the present invention.

Before explaining the embodiment in FIG. 3A, a user may implement a plural of application programs, which will be disclosed later as shown in FIG. 3B. The application program may be a browser, a game and the like. As shown in FIG. 3A, the browser provides tab-browsing. Namely, the user can move to a sub-window intending to browse as he or she opens various sub-windows (termed as 'tab-window' in below) with their own tab and clicks the tab. The tab-window may show the web page of corresponding web-site or a web page hyper-linked to other web-page. It is assumed that the present user browses the corresponding tab-window on the browser.

Referring to FIG. 3A, the controller 12 verifies the number of touch flickings on browsing the corresponding tab-window on the web-browser 301.

If a movement of one touch flickings is detected, the controller 12 scrolls the content shown in the present tab-window in the direction of the touch flickings 303.

And also, if a movement of two-touch flickings is detected, the controller 12 makes switch to other tab-window that is opened 305. If there is no opened tab-window, the two touch flickings makes no action or the controller 12 can scroll the content shown in the present tab-window in the corresponding direction as one touch flicking is detected.

Furthermore, if a movement of three-touch flickings is detected, the controller 12 makes switch to other application program that is opened 307. If there is no opened application program, the three touch flickings makes no action or the controller 12 can make switch to other tab-window that is opened as two-touch flickings is detected.

Figure 3C:
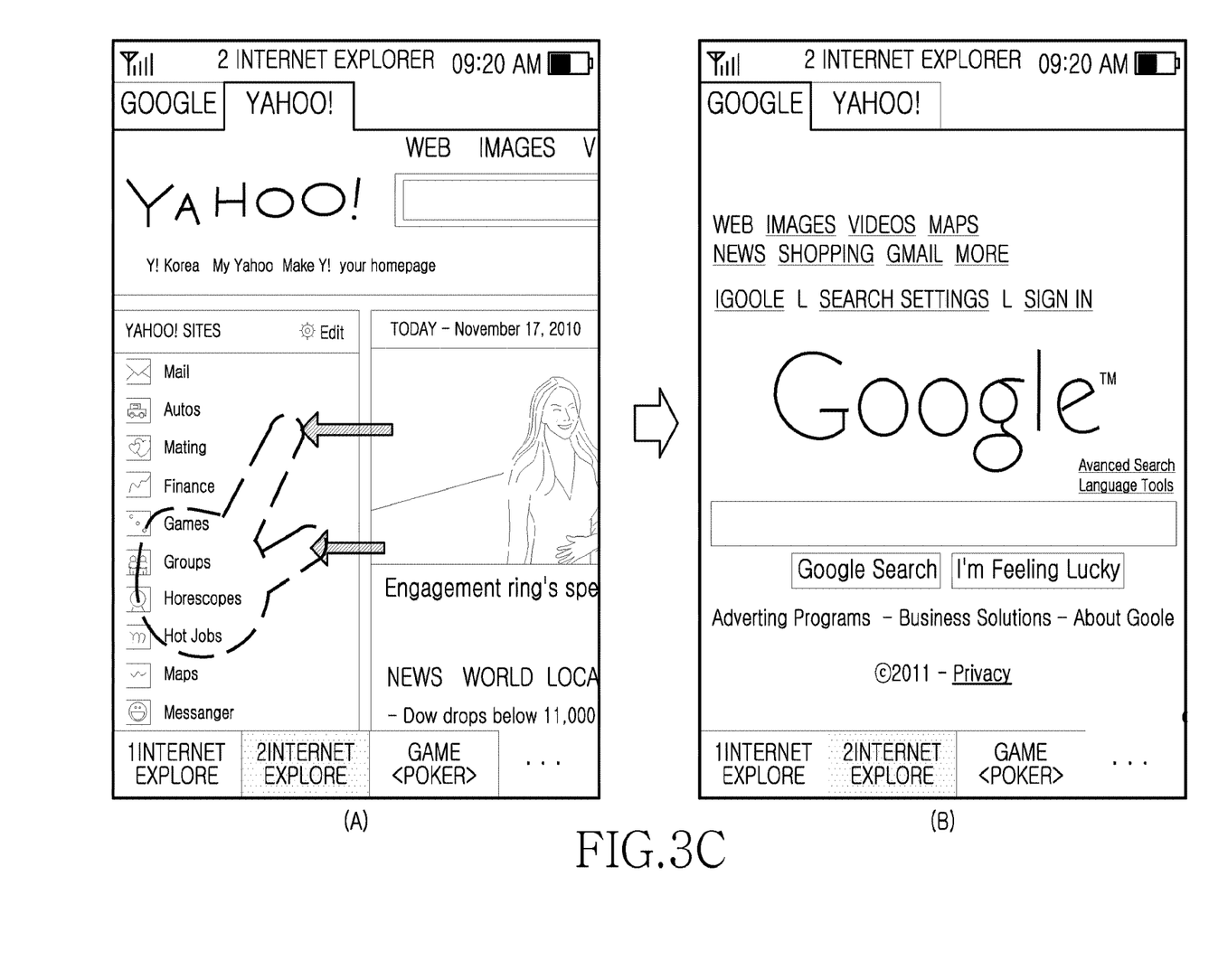
Figure 3D:
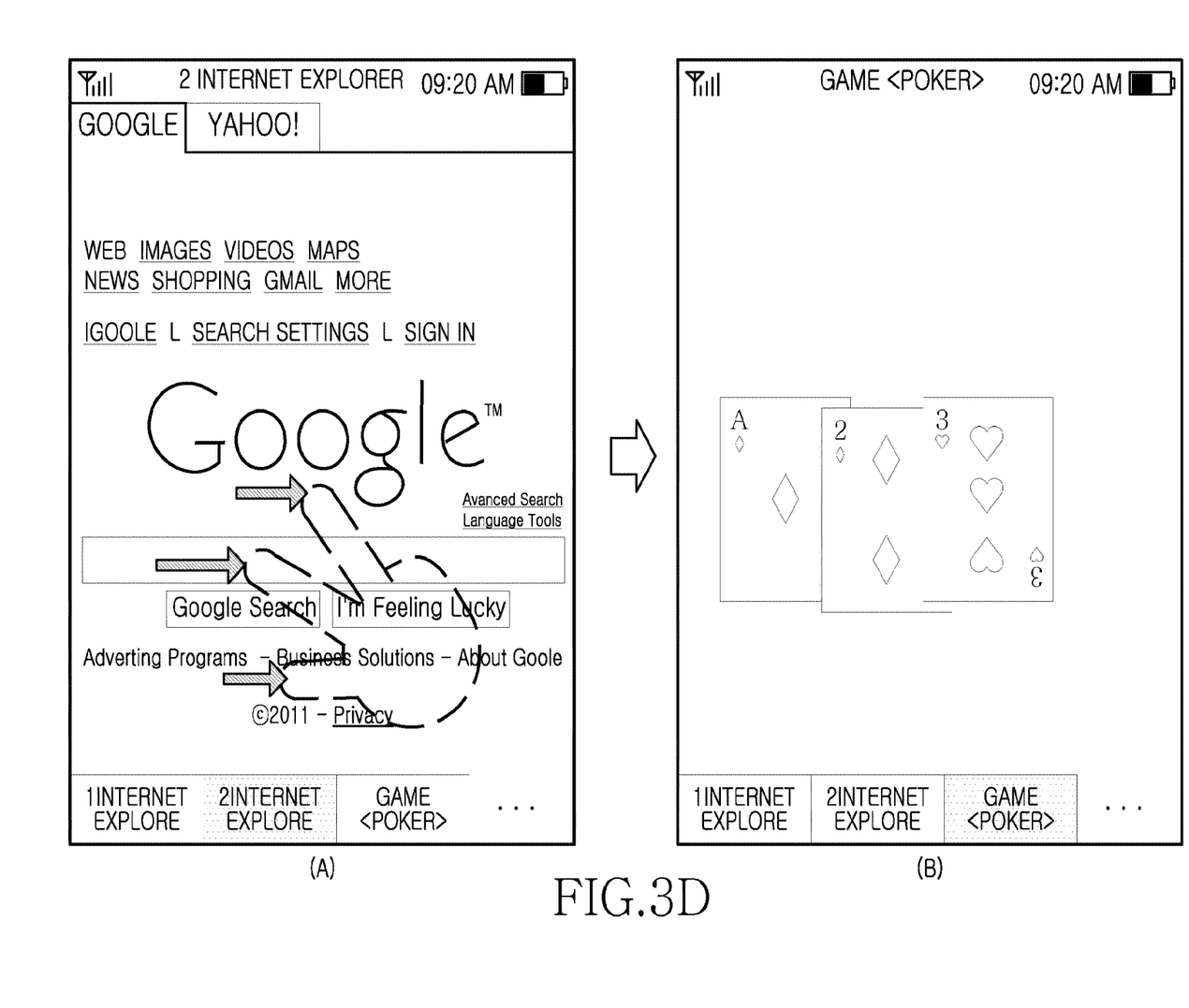

FIG. 3B to 3D is a flowchart illustrating procedure for switching window depending on the number of touch flickings while browsing a web-browser according to an exemplary embodiment of the present invention.

Referring to FIG. 3B to 3D, a user implements various application programs as multi-tasking. For example, it is assumed that opened application programs are two browsers (for example; 1 internet explorer, 2 internet explorer) and a game (for example: Game<Poker>). The touch-screen terminal informs what program is opened presently by setting as tab 311 and the user selects the tab by touch to make switch to the corresponding application program. Also, the browser provides tab-browsing. Namely, the user may open various sub-windows (tab-window) with their own tab to click the tab and may move to the tab-window intending to browse 313. For example, the tab-window can show the web-page of corresponding web-site or can show a web-page hyper-linked to other web-page. For convenience sake, it may be assumed that a user is browsing the corresponding tab-window on the second browser.

Referring to FIG. 3B, if the user touch flickings to the left with one finger (a), the controller 12 scrolls the content shown in the tab-window that is being browsed at present (b). Namely, one-touch flickings makes scroll in the touch flickinged direction.

Referring to FIG. 3C, if the user touch flickings are moved to the left with two fingers (a) (in the direction of the other tab), the controller 12 makes a switch to other tab-window that is opened on the browser window (b). Namely, two-touch flickings makes a switch between tab-windows opened in the browser.

Referring to FIG. 3D, if the user touch flickings to the left or right with three fingers (a), the controller 12 makes a switch to other application program that is opened (b). As shown in FIG. 3D, if three touch flickings occurs to the right, the controller 12 switches the browser window to a Game<Poker> window (b).

If the corresponding application program can't implement scrolling, one-touch flicking makes no action. Also, if the corresponding application program can't support tab-window, two-touch flickings makes no action or makes scrolling as if one touch flicking occurred.

Figure 4A:
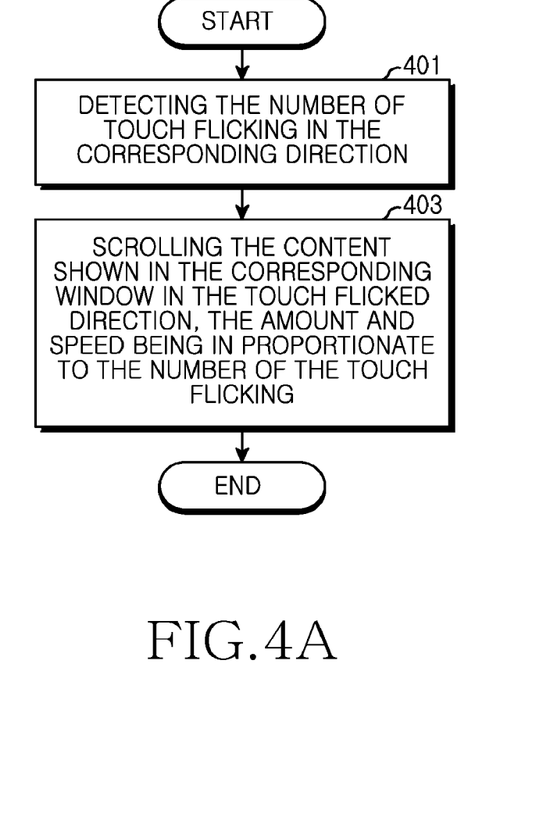
FIG. 4A is a flowchart illustrating procedure of scroll depending on the number of touch flickings according to an exemplary embodiment of the present invention.

FIG. 4A is a flowchart illustrating procedure of scroll depending on the number of touch flickings according to an exemplary embodiment of the present invention.

Referring to FIG. 4A, the controller 12 senses occurrence of touch flickings in the corresponding direction and the number of touch flickings 401. Then, the controller 12 scrolls the content shown in the corresponding window in a movement direction of the touch flickings, making the amounts or speed of the scrolling proportionate or proportional to the number of touch flickings 403 detected. For example, a faster scrolling can be realized as the number of touch flickings detected is higher.

Figure 4D:
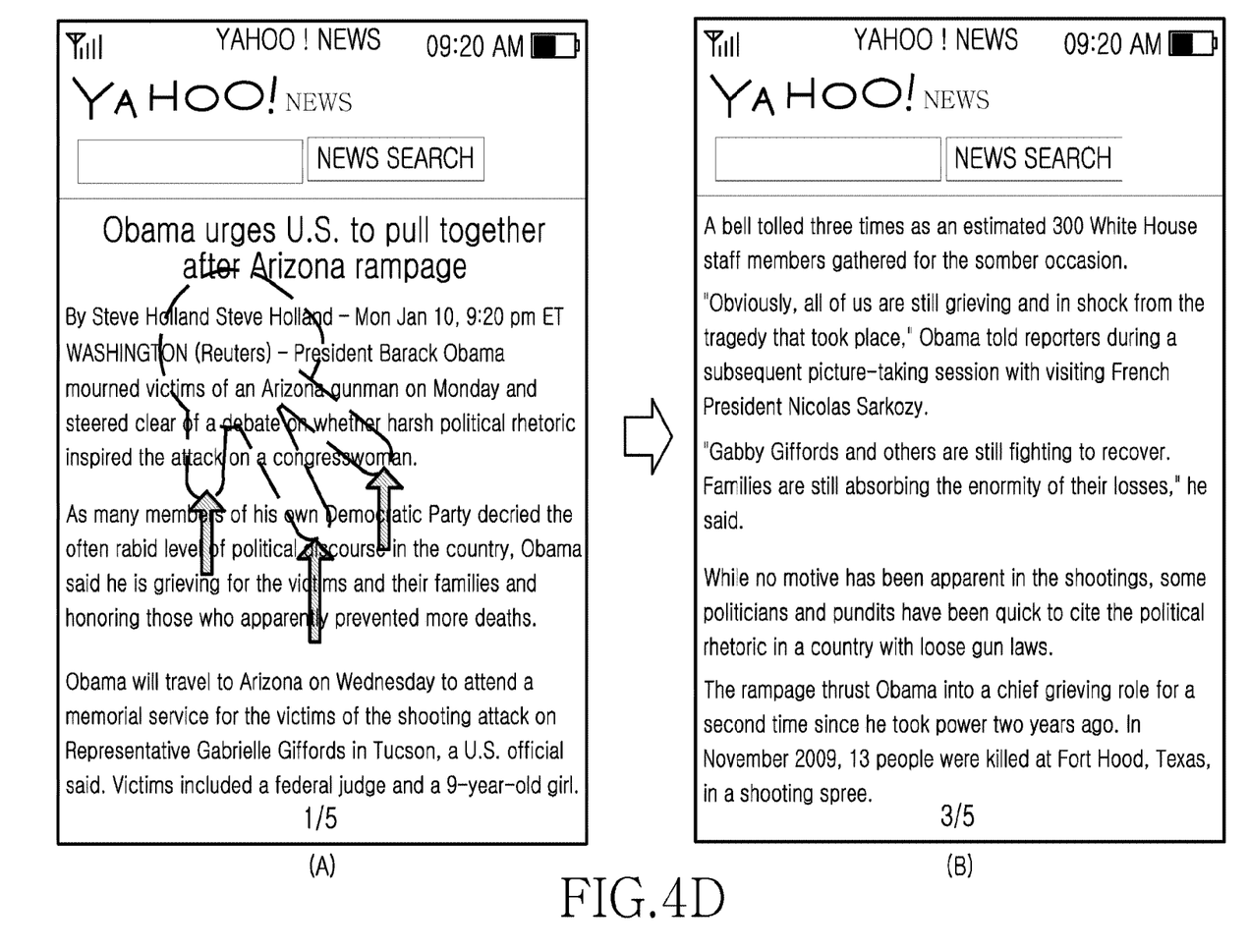

FIG. 4B to FIG. 4D illustrate screens in which to scroll the contents shown on web-browser window according to an exemplary embodiment of the present invention. It is assumed that a user browses a web-page shown in the web-browser. The user can read all the content of the web-page with scrolling.

Referring to FIG. 4B, if the user makes touch flickings upward with one finger (a), the content of the web-page is scrolled upward as much as predetermined amount (b). Referring to FIG. 4C, if the user make touch flickings upward with two fingers (a), the content of web-page is scrolled upward more than the case with one touch flicking (b). Referring FIG. 4D, the user makes touch flickings with three fingers (a), the content of web-page is scrolled upward more than the case with two touch flickings (c). Thus, the amount of scroll increases in proportion to the number of touch flickings. In addition, the speed of scroll may increase in proportion to the number of touch flickings at the same time. For example, when switched from first page to second page, three touch flickings makes a switch more rapidly than one touch flicking. In the above-explanation, though the example was limited to only one to three touch flickings, however, the teachings of above principle may be apply to more than three touch flickings.

In conclusion, the method and the apparatus for processing multi-touch input in a touch-screen terminal according to the present invention can make an easy switch to a corresponding window and make the content shown in the window be scrolled variably and easily according to the movement and the number of the touch flickings detected on the touch screen.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A method for operating a device having a touch screen, the method comprising:

executing a web browser application having one or more tab-windows;

displaying, on the touch screen, a first tab-window of the one or more tab-windows;

while the first tab-window is being displayed, receiving a touch input in the first tab-window on the touch screen;

based on the touch input being an input by a first plurality of fingers in the first tab-window on the touch screen:
  displaying, on the touch screen, a second tab-window of the one or more tab-windows, when the second tab-window is open; and
  scrolling the contents included in the first tab-window based on the touch input, when the second tab-window is not open; and based on the touch input being an input by a second plurality of fingers in the first tab-window on the touch screen, displaying, on the touch screen, an execution screen of another application which is being executed, wherein the second plurality of fingers is one greater than the first plurality of fingers.

2. A mobile device, comprising:

a touch screen; and at least one processor electrically connected with the touch screen, configured to:

execute a web browser application having one or more tab-windows;

display, on the touch screen, a first tab-window of the one or more tab-windows;

while the first tab-window is being displayed, receive a touch input in the first tab-window on the touch screen;

based on the touch input being an input by a first plurality of fingers in the first tab-window on the touch screen:
  display, on the touch screen, a second tab-window of the one or more tab-windows, when the second tab-window is open; and
  scroll the contents included in the first tab-window based on the touch input in the first direction, when the second tab-window is not open; and based on the touch input being an input by a second plurality of fingers in the first tab-window on the touch screen, display, on the touch screen, an execution screen of another application which is being executed, wherein the second plurality of fingers is one greater than the first plurality of fingers.

* * * * *